Aug. 15, 1939 W. H. PARKIN 2,169,813
MECHANICAL REMOTE CONTROL APPARATUS
Filed Feb. 23, 1938
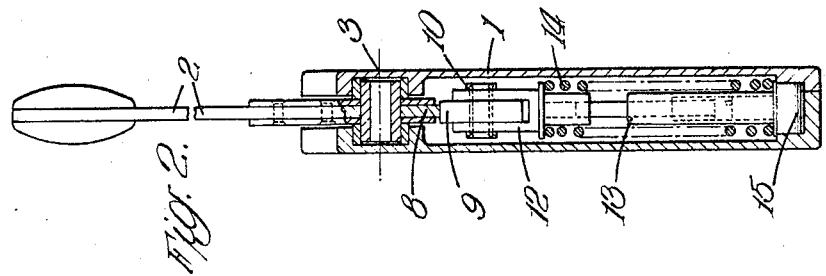
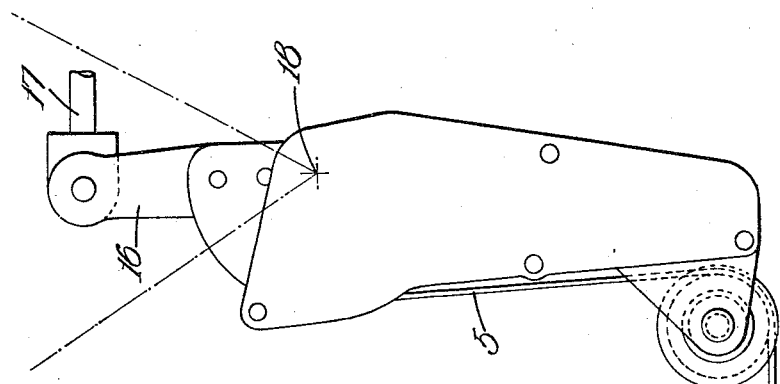
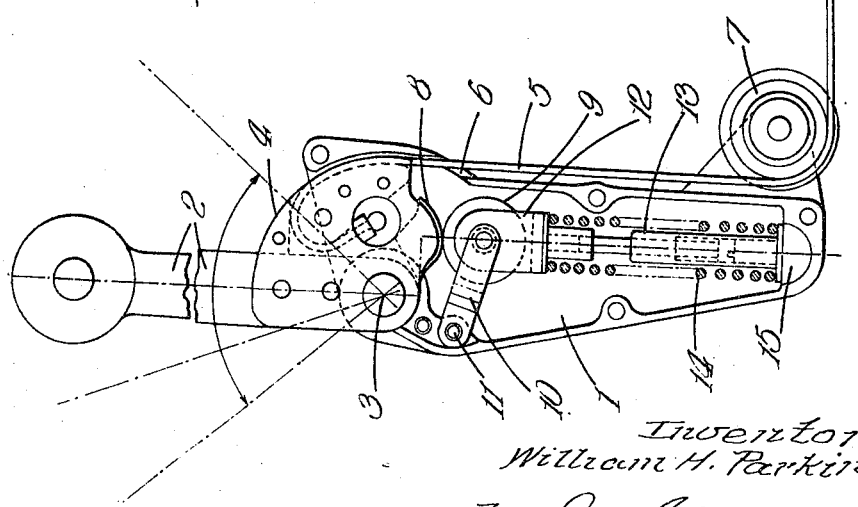
Inventor-
William H. Parkin
By [signature]
Atty Patented Aug. 15, 1939

2,169,813

UNITED STATES PATENT OFFICE 2,169,813

MECHANICAL REMOTE CONTROL APPARATUS

William Hugh Parkin, Alperton, England, assignor to Exactor Control Company Limited, Alperton, Middlesex, England Application February 23, 1938, Serial No. 192,144
In Great Britain March 13, 1937

8 Claims. (Cl. 74—501)

This invention relates to mechanical remote control apparatus such, for example, as may be used for engine controls of aircraft, controls of boats, rail cars, vehicles in general, or in stationary plant. An object of the invention is to provide a relatively light and simple form of control. Throttle and like controls, and indeed many mechanical systems have hitherto been used very commonly, in which a manual lever at one station is connected by a rod system to an operated movable element such as another lever; this has its inconveniences, and disadvantages. Another general type of control involves the use of two flexible cables suitably led and arranged so that one or the other is tensioned according to the sense of operation of the control. One of the principal objects of the present invention is to provide a control with the advantages of two-way operation but only necessitating a connection stressed in one sense of direction. It may be mentioned perhaps that where we refer to a cable, we do not intend to exclude the possibility that some part of the length of the bond between one station and another may be a compression member, for example, a rod, other parts being tension members in the nature of cable. Another object of the invention is the elimination of back-lash and loose parts, which may contribute substantially to accuracy of following or accurate synchronisation of one station with the other. The invention consists virtually in the application to mechanical controls of a principle known in connection with hydraulic control, and the change involved consists mainly in the provision of a mechanical bond between the two stations, there being provided resilient means for keeping the bond as a whole in tension, which is of course impossible in a hydraulic control. So far as I am aware it is also novel in mechanical remote controls to provide stations each having a control element urged in one sense by a spring, and each having means for maintaining the effect of the effort of its spring constant in all positions. Yet another object of the invention is the provision of a mechanical control with a single bond, which may remain in any position of operation without the necessity for frictional or other locking means. The invention makes use of the well known fact that a spring or springs in combination, whilst individually obeying Hooke's law, may be so arranged or combined with mechanical devices that its or their ultimate effect is to afford constant resistance whatever the position of the mechanism and consequent spring deflection. Examples of such devices are known in connection with resilient suspension systems, for instance.

According to the invention a mechanical remote control system comprises a mechanical bond preferably in the nature of a cable, between two stations connecting movable elements at each station, and spring (or other resilient) means at each station for keeping the bond as a whole in tension, accompanied by means for maintaining the effort exerted by the spring or resilient means of one station substantially equal to the effort exerted by that of the other station in all positions of the control. Where the bond is referred to as being in tension, it is clear that some part of it if it be comprised by a rod or the like, or by angularly movable parts such as bell cranks, need not necessarily be in tension but may be subjected to compression or bending load, providing, however, that the bond as a whole is under tension. The invention further consists in a system comprising an operator movable element at one station and a receiver movable element at another station, a flexible cable interconnecting these elements and arranged to be guided in tension by means such as tubes, pulleys, or other fairleads, springs on each station to urge the elements in opposite operative sense, thus applying tension in the cable, and cam means at each station to affect the effective effort of the springs so that their efforts (that is, the effort of one spring in respect of the effort of the other) are substantially balanced throughout the range of movement of the system. Underlying the invention is the concept that a spring or equivalent obeying as it does the law that strain is proportional to stress, will exert a greater effort when compressed than when somewhat relaxed. Thus in our control there being a spring at each station, and these springs being in opposition as it were, their efforts are made to balance by virtue of the fact that they operate with leverages inversely proportional to their distortions; e. g. as one spring is compressed, its operative leverage decreases, whilst at the same time the other spring is relaxed and its leverage increases. Constructional features are also included in the invention, as will become apparent from the following description of one mode of carrying it into effect which will be described in relation to the accompanying drawing, in which:

Figure 1 is an elevation of the two stations of a control with a cable bond between them; and Figure 2 is a sectional elevation of the operator station at right angles to the view of Figure 1.

At the operator's station there is provided a hollow casing 1 forming a mounting for a hand hand lever 2 which is pivoted at 3 to the walls of the casing (one wall, which may be an inspection and access cover, is deemed to have been removed in Figure 1). To the lever 2 there is secured for example by rivets, an arcuate peripherally grooved quadrant 4 to receive the flexible cable 5 which enters the casing through a slot 6, being led thereto by a pulley 7 borne by the casing. Also rigid with the lever 2 and quadrant 4 is a peripheral cam 8 the function of which will be described. A cam follower roller 9 is borne by a rocker lever 10 which is pivotally mounted at 11 in the casing 1. Pivoted at the same axis as the roller 9 is a fork 12 carried by the upper end of a telescopic rod structure 13 which acts as a guide for, and is surrounded by, a compression spring 14. The lower end of this rod structure 13 carries an arcuate block 15 which is rockable in a suitably formed recess in the bottom of the casing 1.

The received or operated station has an exactly similar internal construction and an operated lever element 16 which may be connected for example by a rod 17, to the part to be controlled, e. g. a throttle valve. The lever 16 rocks on the centre 18. The cam 8 in its relation to the arcuate path of movement of the roller 9, is so shaped that the moment exerted by the effort of the spring 14 about the axis of movement of the lever 2 is of a constant value in all positions within the range of movement of the control. To this end the cam and cam follower combination is such that the effective radius at which the effort of the spring operates upon the lever varies with the degree of compression of the spring. The lever 16 preferably moves between definite stops which limit its scope; a movement of 60° is given in the example. Preferably the scope allowed for the lever 2 is somewhat greater, whereby any stretch or thermal change of length in the cable 5 may be accommodated.

It will be obvious that many constructional variations may be imported without departing from the advantages and functions of the particular case described. For example, the pulley quadrant 4 may be designed to have a cam action (somewhat like a fusee) to contribute to the balancing function; the spring may be arranged to operate in tension rather than compression; some part of the length of the cable 5 may be replaced by a pair of levers and a compression rod, and so forth.

What I claim is:

1. A mechanical remote control system comprising a movable element at each of two stations, a mechanical bond between such elements, a single resilient means at each station for keeping said bond in tension, and means at each station for substantially equalising the efforts of said single resilient means automatically in all positions of the control.

2. A mechanical remote control system comprising two movable elements one at each station, a single mechanical bond interconnecting said elements, a single element associated with each movable element to urge it in one sense by spring effort, and means for automatically maintaining the effect of such efforts constant in all positions of said elements.

3. A mechanical remote control system comprising an operator movable element at one station, a receiver movable element at another station, a flexible cable interconnecting said elements, means for guiding said cable in a tension path, springs associated with said elements to urge them in opposed operative sense against tension in said cable, and cam means at each station to affect the effective efforts of said springs so as to substantially balance the effort of one in respect of the effort of the other in any position of the elements and cable.

4. In a mechanical remote control system, a station comprising a casing, a lever borne pivotally thereby, a spring housed by said casing, a cam moving with said lever, a cam-follower cooperating with said cam and urged thereto by said spring, said cam, cam follower, and spring being so adapted that the spring applies the same moment to the lever in all positions thereof.

5. A system according to claim 4, in which said lever has rigid with it a pulley quadrant to receive the end of said tension bond.

6. A mechanical remote control system comprising a pair of hollow casings, bearings therein, a lever supported in each casing by said bearings, a peripherally grooved quadrant rotatable with each lever, a cam rotatable with each lever, a rocker pivotally mounted in each casing, a roller carried by said rocker to bear against the cam, a compression spring acting to bear said roller against said cam, a cable interconnecting the two levers against the efforts of the springs, and guide means to define a path for said cable.

7. A mechanical remote control system comprising a movable element at each station, a mechanical bond between said elements, resilient means at each station for applying efforts in said bond to keep it in tension, and means for substantially equalizing said efforts automatically in all positions of the control.

8. A mechanical remote control system comprising two movable elements one at each station, a single mechanical bond interconnecting said elements, spring means connected to each element to urge it in one sense and to apply an effort in said mechanical bond, and means for automatically maintaining said efforts constant and substantially equal in all positions of said elements.

WILLIAM HUGH PARKIN.